(12) United States Patent
Dinc et al.

(10) Patent No.: US 6,786,487 B2
(45) Date of Patent: Sep. 7, 2004

(54) ACTUATED BRUSH SEAL

(75) Inventors: Osman Saim Dinc, Troy, NY (US); Norman Arnold Turnquist, Sloansville, NY (US); Mehmet Demiroglu, Troy, NY (US); Hamid Reza Sarshar, Clifton Park, NY (US); Ahmad Safi, Troy, NY (US); Mahmut Faruk Aksit, Troy, NY (US); Roger Neal Johnson, Hagaman, NY (US); Anthony Holmes Furman, Scotia, NY (US); Imdad Imam, Schenectady, NY (US); Gerald Burt Kliman, Niskayuna, NY (US); James Hopkins, Simpsonville, SC (US); Richard Robert Larsen, Cookeville, TN (US); David Michael Prowse, Cookeville, TN (US); Steven Wayne Russell, Cookeville, TN (US)

(73) Assignee: General Electric Company, Niskayuna, NY (US)

( * ) Notice: Subject to any disclaimer, the term of this patent is extended or adjusted under 35 U.S.C. 154(b) by 17 days.

(21) Appl. No.: 09/683,254

(22) Filed: Dec. 5, 2001

(65) Prior Publication Data

US 2003/0102630 A1 Jun. 5, 2003

(51) Int. Cl.⁷ .................................................. F01D 11/02
(52) U.S. Cl. ......................... 277/355; 277/413; 277/929
(58) Field of Search ................................. 277/355, 413, 277/500, 505, 929, 399, 401, 408

(56) References Cited

U.S. PATENT DOCUMENTS

| | | | | |
|---|---|---|---|---|
| 5,002,288 A | * | 3/1991 | Morrison et al. | 277/413 |
| 5,603,510 A | * | 2/1997 | Sanders | 277/413 |
| 5,630,590 A | * | 5/1997 | Bouchard et al. | 277/301 |
| 5,794,942 A | * | 8/1998 | Vance et al. | 277/303 |
| 5,971,400 A | * | 10/1999 | Turnquist et al. | 277/416 |
| 6,027,121 A | * | 2/2000 | Cromer et al. | 277/347 |
| 6,045,134 A | * | 4/2000 | Turnquist et al. | 277/347 |
| 6,299,077 B1 | | 10/2001 | Harmon et al. | |
| 6,308,958 B1 | * | 10/2001 | Turnquist et al. | 277/355 |
| 6,343,792 B1 | * | 2/2002 | Shinohara et al. | 277/355 |
| 6,435,514 B1 | * | 8/2002 | Aksit et al. | 277/355 |
| 6,502,823 B1 | * | 1/2003 | Turnquist et al. | 277/355 |

* cited by examiner

Primary Examiner—William L. Miller
(74) Attorney, Agent, or Firm—Paul J. DiConza; Patrick K. Patnode (57) ABSTRACT

An actuated seal assembly for controlling flow in a fluid path in turbomachinery comprising a seal and a seal carrier coupled to the seal is provided. A displacement apparatus is coupled to the seal carrier for positioning the seal so as to control the flow in the fluid path. In addition, a drive system is provided for powering the displacement apparatus.

14 Claims, 9 Drawing Sheets

ACTUATED BRUSH SEAL

BACKGROUND OF INVENTION

The present invention relates generally to rotary machines, and more particularly to an actuated seal for a rotary machine such as steam and gas turbines.

Rotary machines include, without limitation, turbines for steam turbines and compressors and turbines for gas turbines. A steam turbine has a steam path that typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, a gas path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

It is known in the art of steam turbines to position, singly or in combination, variable clearance labyrinth-seal segments and brush seals in a circumferential array between the rotor of the turbine and the circumferentially surrounding casing to minimize steam-path leakage. Springs hold the segments radially inward against surfaces on the casing that establish radial clearance between seal and rotor but allow segments to move radially outward in the event of rotor contact. While labyrinth seals, singly or in combination with brush seals, have proved to be quite reliable, their performance degrades over time as a result of transient events in which the stationary and rotating components interfere, rubbing the labyrinth teeth into a "mushroom" profile and opening the seal clearance.

Accordingly, there is a need in the art for a rotary machine having good leakage control between stationary and rotating components.

SUMMARY OF INVENTION

The present invention provides an actuated seal assembly for controlling flow in a fluid path in turbomachinery comprising a seal and a seal carrier coupled to the seal. A displacement apparatus is coupled to the seal carrier for positioning the seal so as to control the flow in the fluid path. In addition, a drive system is provided for powering the displacement apparatus.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
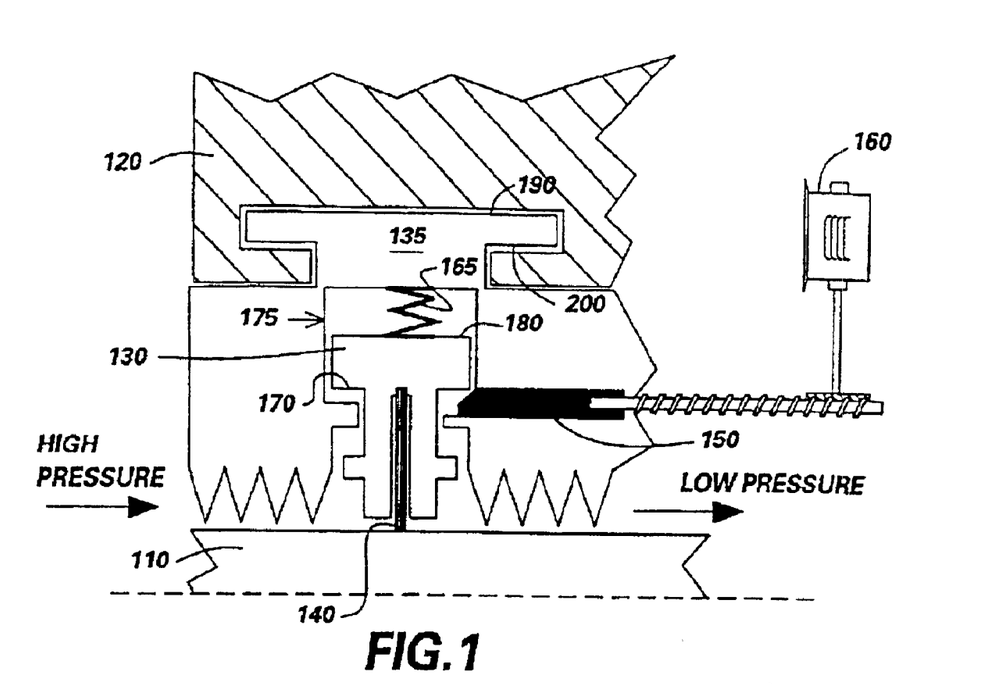
FIG. 1 is a schematic, cross-sectional exploded view of an actuated seal comprising a labyrinth seal having a seal carrier disposed therein in accordance with the present invention.

An actuated seal assembly, generally designated 100, disposed between a rotating member 110, for example a rotor, and a stationary turbine housing 120, comprises an arcuate seal carrier 130 disposed adjacent to rotating member 110 separating pressure regions on axially opposite sides of arcuate seal carrier 130 (see FIG. 1). FIG. 1 shows a labyrinth seal 135 having an arcuate seal carrier 130 disposed therein. Seal carrier 130 typically comprises, but is not limited to, at least one seal 140, for example, at least one brush seal bristle, coupled to the seal carrier 130 and a displacement apparatus 150 coupled to the seal carrier 130. It will be appreciated that displacement apparatus 150 typically comprises an actuator, a return device or a combination thereof. In an alternative embodiment, displacement apparatus 150 is coupled to the labyrinth seal top portion 190, or alternatively, the labyrinth seal bottom portion 200. In addition, a drive system 160, for example, is used to power displacement apparatus 150.

These components form part of a turbine in which a flowing fluid medium in a fluid path, for example, gas or steam, is passed between the rotating member 110 and housing 120. In an alternative embodiment, fluid medium typically comprises a liquid. It will be appreciated, however, that fluid path flows from the high pressure side towards the low pressure side, i.e., from the left to right of drawing FIG. 1. In operation, displacement apparatus 150 actuates the seal carrier 130, or alternatively the labyrinth seal 135, to either lift off or to adjust seal carrier 130 position during operation or during transient events, for example, during startup and shutdown. It will be appreciated that seal carrier 130 and at least one seal 140 is typically either internally or externally adjustable depending on the application. That is, actuated seal assembly 100 is located internal or external to the turbine and adjusts seal carrier 130 and accompanying seal 140 from such respective location. As a result, the life of the seal 140 (e.g. bristles) is extended by actuating the seal carrier 130 before bristles or seal carrier 130 rub against rotating member 110. The life and performance of the brush seal bristles, singly or in combination with other seals, for example, is increased due to the fact that the bristles are not continuously rubbing at high speed which causes the bristles to reach a melting temperature or cause excessive wear. In addition, the performance of labyrinth teeth seals 135, singly or in combination with other seals, for example, does not degrade over time because the teeth are less prone to be rubbed into a "mushroom" profile thus maintaining an optimal seal clearance between labyrinth seal 135 and rotating member 110.

The drive system 160 typically comprises a motor, a pump, an electric power supply or the like. The motor typically comprises a linear motor, rotary motor or the like. In one embodiment, such motor is typically coupled to the displacement apparatus 150 by gears, cables, wires, pulleys or the like. The pump typically comprises a gas pump, water pump, hydraulic pump or the like and the electric power supply typically comprises a piezoelectric device or the like. It will be appreciated that drive system 160 is typically manually or electrically actuated and that the position of the drive system 160 is typically internal or external to actuated seal 100.

In one embodiment, the seal carrier 130, singly or in combination, typically comprises at least one seal 140, for example, at least one brush seal bristle. It will be appreciated that other seals 140 typically include, but are not limited to, labyrinth seals, abradable seals, honeycomb seals, leaf seals, finger seals, ceramic seals, aramid seals, aspirating seals and combinations thereof. It will be appreciated that seal carrier 130 is typically combined with a labyrinth seal carrier having the aforementioned components, singly or in any combination thereof (not shown). The displacement apparatus 150 typically comprises, but is not limited to, at least one displacement device such as a spring, bellows, inflatable tube, rod, cam, hydraulic cylinder, pneumatic device, piezoelectric device, wire, cable, bimetallic material, phase changing material, solenoid, or combinations thereof. It will be appreciated that the displacement apparatus 150 typically works in conjunction with at least one spring 165 to return seal carrier 130 to its initial position.

Figure 2:
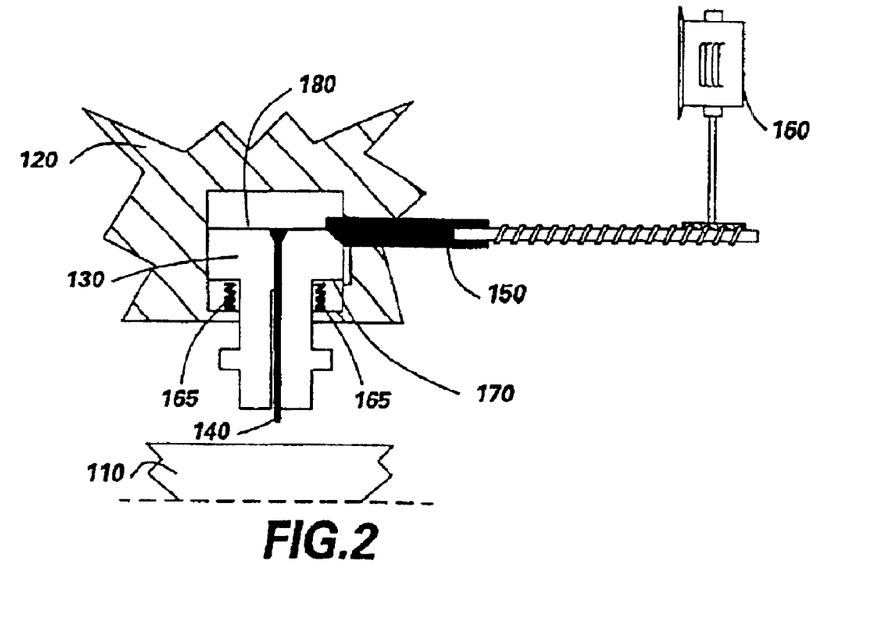
FIG. 2 is a schematic, cross-sectional exploded view of an actuated seal comprising a seal carrier disposed in a housing.
Figure 3:
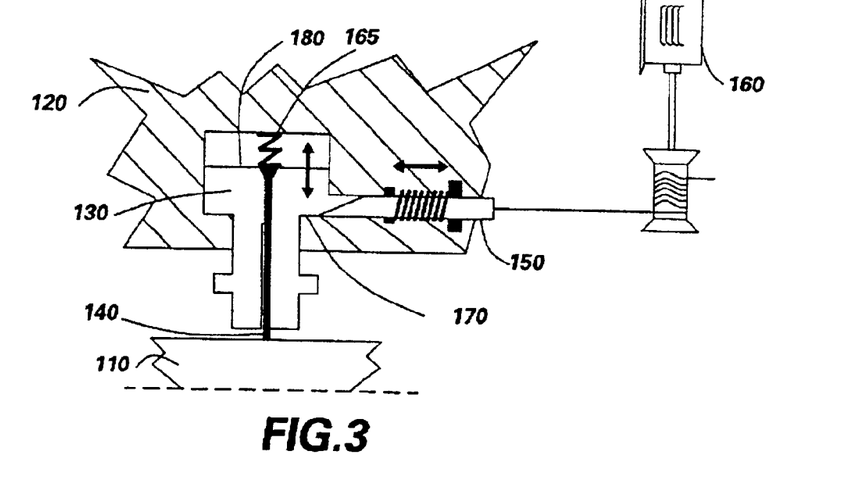
FIG. 3 is a schematic, cross-sectional exploded view of another embodiment of the instant invention.

In one embodiment, the rod, for example, is positioned directly between seal carrier bottom portion 170 and labyrinth channel 175. In an alternative embodiment, the rod is positioned directly between seal carrier top portion 180 and labyrinth channel 175. Here, the drive system 160, coupled to the displacement apparatus 150 by a screw, for example, actuates the rod to raise or adjust seal carrier 130. It will be appreciated by one of ordinary skill in the art that the drive system 160 is typically bi-directional so as to allow the actuated rod to lift, lower or adjust the seal carrier 130 during operation. In another embodiment, the rod is typically positioned directly between seal carrier top portion 180 and housing 120 (see FIG. 2). In an alternative embodiment, the rod is typically positioned directly between seal carrier bottom portion 170 and housing 120. In addition, the aforementioned embodiments typically comprise least one spring 165 disposed between seal carrier bottom portion 170 and housing 120, seal carrier top portion 180 and housing 120, seal carrier bottom portion 170 and labyrinth channel 175, and seal carrier top portion 180 and labyrinth channel 175. In FIG. 2, the spring 165 provides a constant outward radial force keeping the seal 140 of seal carrier 130 from touching rotating member 110. In operation, the rod is actuated by the drive system 160 to lower or adjust seal carrier 130 and respective seal 140 with respect to rotating member 110. In a further embodiment, a spring-loaded rod is typically positioned between seal carrier bottom portion 170 and housing 120 (see FIG. 3). Here, the drive system 160, coupled to the spring-loaded rod by a wire, for example, actuates the spring-loaded rod so as to raise, lower or adjust the seal carrier 130 with respect to the rotating member 110. Alternatively, it will also be appreciated that the spring-loaded rod is typically positioned between seal carrier top portion 180 and housing 120 to perform the same functions discussed above. The rod, in any embodiment discussed herein, is typically tapered or formed so as to allow ease of penetration between seal carrier top or bottom portions 170, 180 and housing 120.

Figure 4:
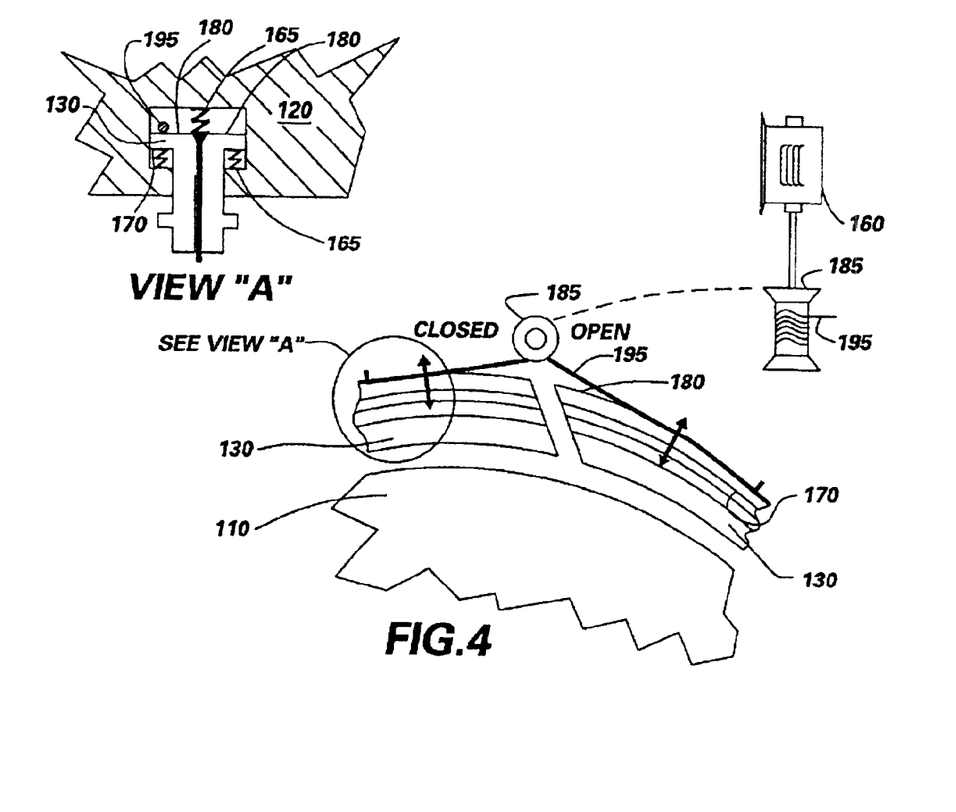
FIG. 4 is a schematic, cross-sectional exploded view of another embodiment of the instant invention.

In another embodiment, a wire 195 or cable, for example, is coupled to seal carrier 130 to force seal carrier 130 radially inwardly or radially outwardly (see FIG. 4). Here, the drive system 160 is coupled to a wire spool 185, for example, to actuate the seal carrier 130 radially inwardly or radially outwardly depending upon the configuration of the wire on the seal carrier segment. As used herein, "on", "in", "over", "above", "under" and the like are used to refer to the relative location of elements of actuated seal 100 as illustrated in the Figures and is not meant to be a limitation in any manner with respect to the orientation or operation of actuated seal 100. In operation, the wire spool 185 is rotated clockwise or counterclockwise, for example, so as to radially inwardly move seal carrier 130 or radially outwardly move seal carrier 130. For illustrative purposes herein, when the wire spool 185 is rotated clockwise by drive system 160, for example, the wire 195 circumference is decreased thereby reducing the radial distance between seal carrier 130 and rotating member 110. When the wire spool 185 is rotated counterclockwise by drive system 160, for example, the wire 195 circumference is increased thereby increased the radial distance between seal carrier 130 and rotating member 110. It will be appreciated that at least one spring 165 is typically located on seal carrier bottom portion 170 so as to provide an opposing radial force when the wire spool 185 is rotated clockwise. In addition, the position of at least one spring 165 on seal carrier bottom portion 170 allows seal carrier 130 to move radially outward when the wire spool 185 is rotated counterclockwise. In addition, at least one spring 165 is typically located on seal carrier top portion 180 so as to provide an opposing radial force when wire spool 185 is rotated counterclockwise, for example. It will be appreciated that at least one wire 195 or cable, for example, is typically coupled to at least one seal carrier 130, a plurality of seal carriers 130 or all of the seal carriers 130 in actuated seal 100.

Figure 5:
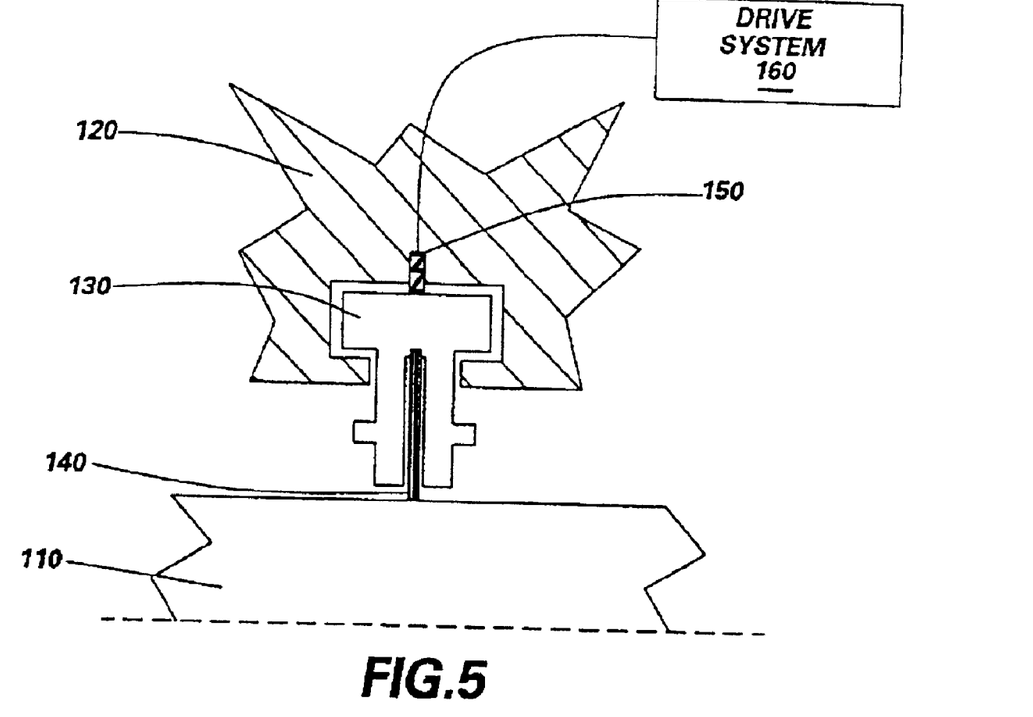
FIG. 5 is a schematic, cross-sectional exploded view of another embodiment of the instant invention.

In another embodiment, the drive system 160, for example an electric power supply, is coupled to the displacement apparatus 150 which is coupled to seal carrier 130 (see FIG. 5). Here, the displacement apparatus 150 typically comprises, singly or in combination, at least one operating device such as a piezoelectric device, electromagnetic device, phase changing material, bimetallic material, electric heater, and the like. In operation, drive system 160 actuates the displacement apparatus 150 to force seal carrier 130 radially with respect to rotating member 110. It will be appreciated that at least one displacement apparatus 150 is typically coupled to at least one seal carrier 130, a plurality of seal carriers 130 or all of the seal carriers 130 in actuated seal 100.

Figure 6:
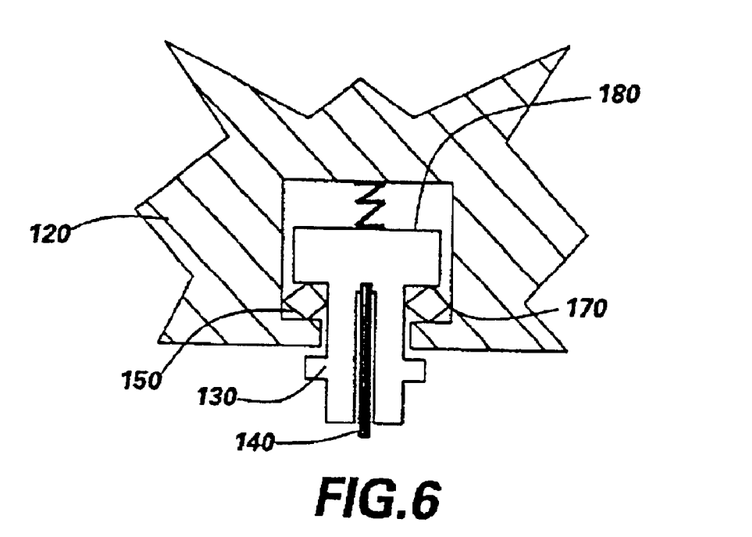
FIG. 6 is a schematic, cross-sectional exploded view of another embodiment of the instant invention.
Figure 7:
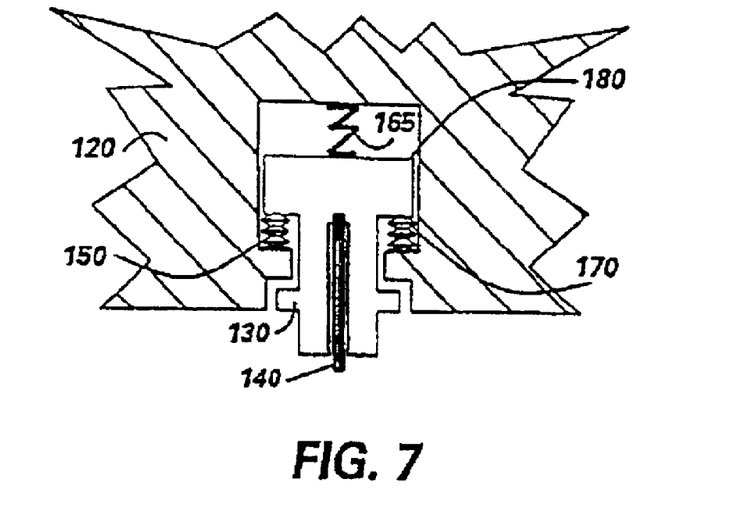
FIG. 7 is a schematic, cross-sectional exploded view of another embodiment of the instant invention.

In another embodiment, the displacement apparatus 150, for example, at least one elongated tube (see FIG. 6), at least one bellows (see FIG. 7) or a combination thereof, is disposed between seal carrier bottom portion 170 and housing 120. In an alternative embodiment, the displacement apparatus 150 is disposed between seal carrier top portion 180 and housing 120. In operation, the tube or bellows is inflated to radially outwardly move seal carrier 130 and accompanying bristles 140 from rotating member 110. In an alternative embodiment, the tube or bellows (disposed between seal carrier top portion 180 and housing 120) is inflated to radially inwardly move seal carrier 130 and accompanying bristles towards housing 120. In this embodiment, it will be appreciated that before displacement apparatus 150 is actuated and at least one spring 165 is typically disposed between seal carrier top portion 180 and housing 120 so as to radially inwardly force seal carrier 130 and accompanying seal 140 toward rotating member 110. Alternatively, at least one spring 165 is typically disposed between seal carrier bottom portion 170 and housing 120 so as to radially outwardly force seal carrier 130 and accompanying seal 140 from rotating member 110. It will be appreciated that at least one tube or bellows, for example, is typically coupled to at least one seal carrier 130, a plurality of seal carriers 130 or all of the seal carriers 130 in actuated seal 100.

Figure 8:
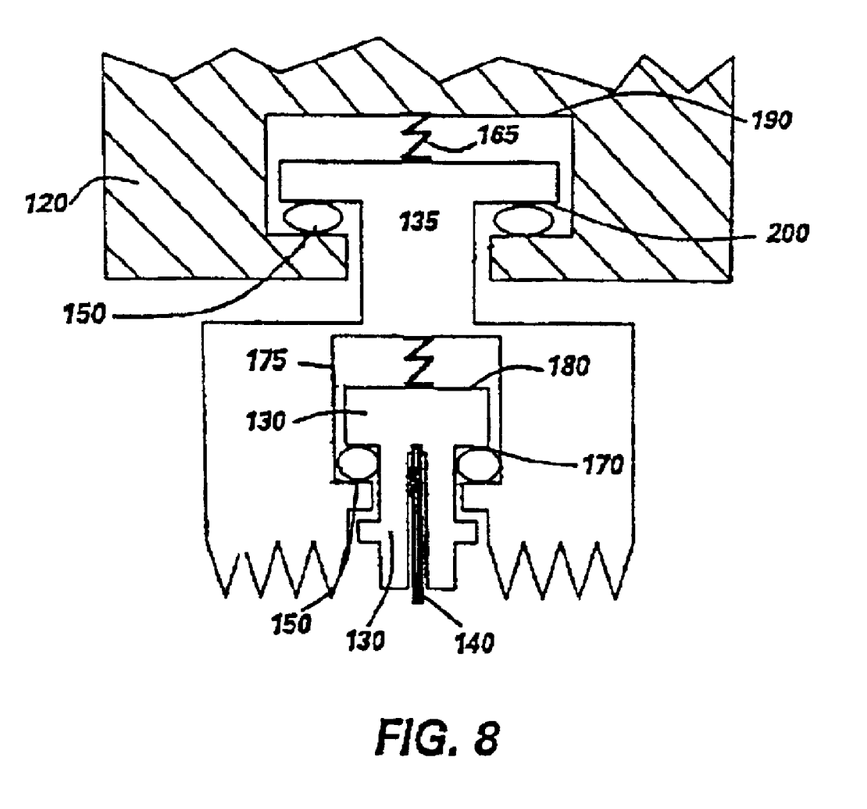
FIG. 8 is a schematic, cross-sectional exploded view of another embodiment of the instant invention.

In another embodiment, actuated seal assembly 100 comprises a labyrinth seal 135 having seal carrier 130 disposed therein (see FIG. 8). In this embodiment, the displacement apparatus 150, for example, at least one elongated tube, at least one bellows or any combination thereof, is disposed between seal carrier bottom portion 170 and labyrinth channel 175. In addition, displacement apparatus 150 is disposed between labyrinth seal bottom portion 200 and housing 120. It will be appreciated that displacement apparatus 150 location in combination with a spring 165 is typically varied. For example, displacement apparatus 150 is typically disposed between seal carrier top portion 180 and labyrinth channel 175, disposed between labyrinth seal top portion 190 and housing 120, or in any combination with the aforementioned embodiments.

Figure 9:
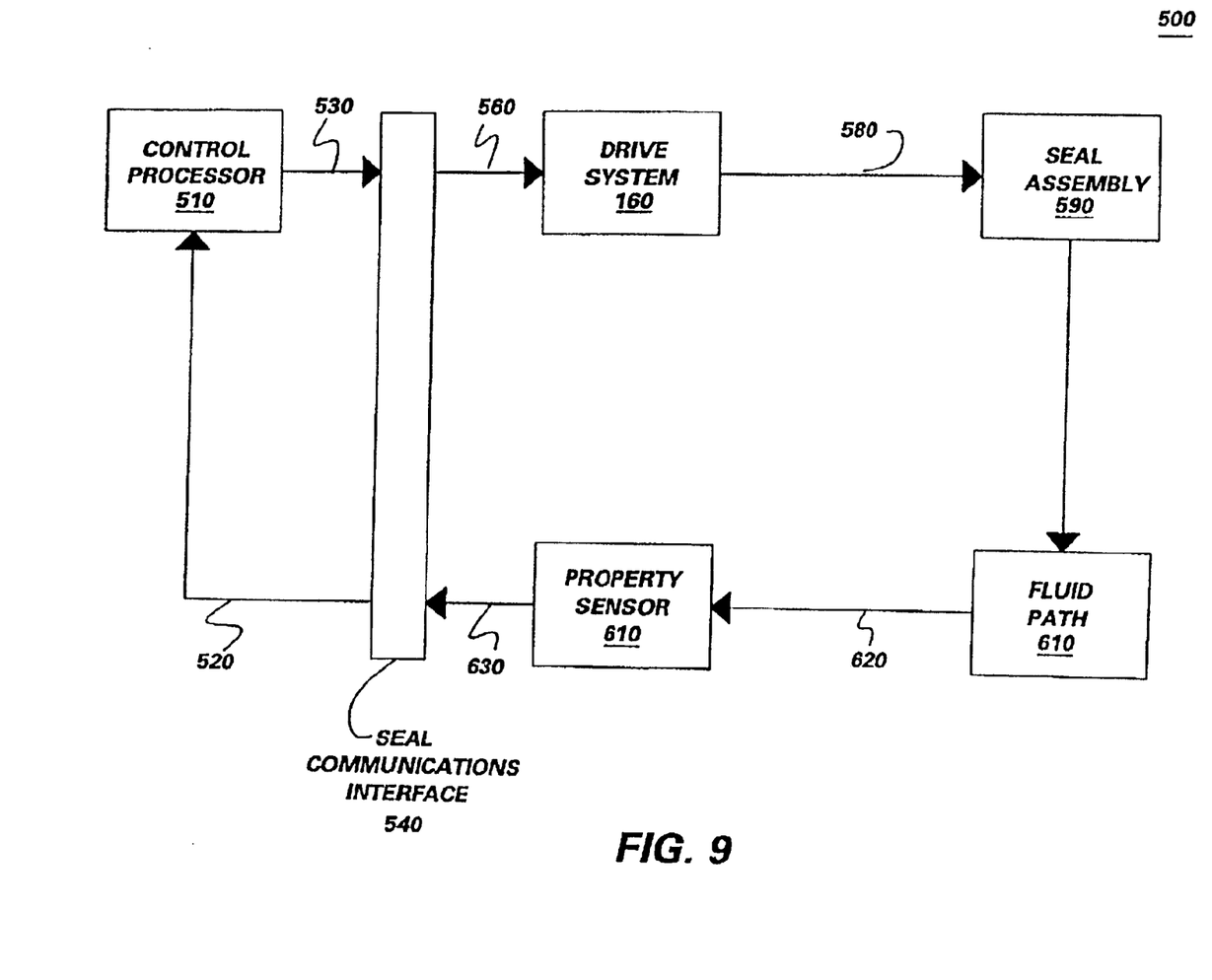
FIG. 9 shows a block diagram (e.g. flow chart) of the instant invention.
Figure 10:
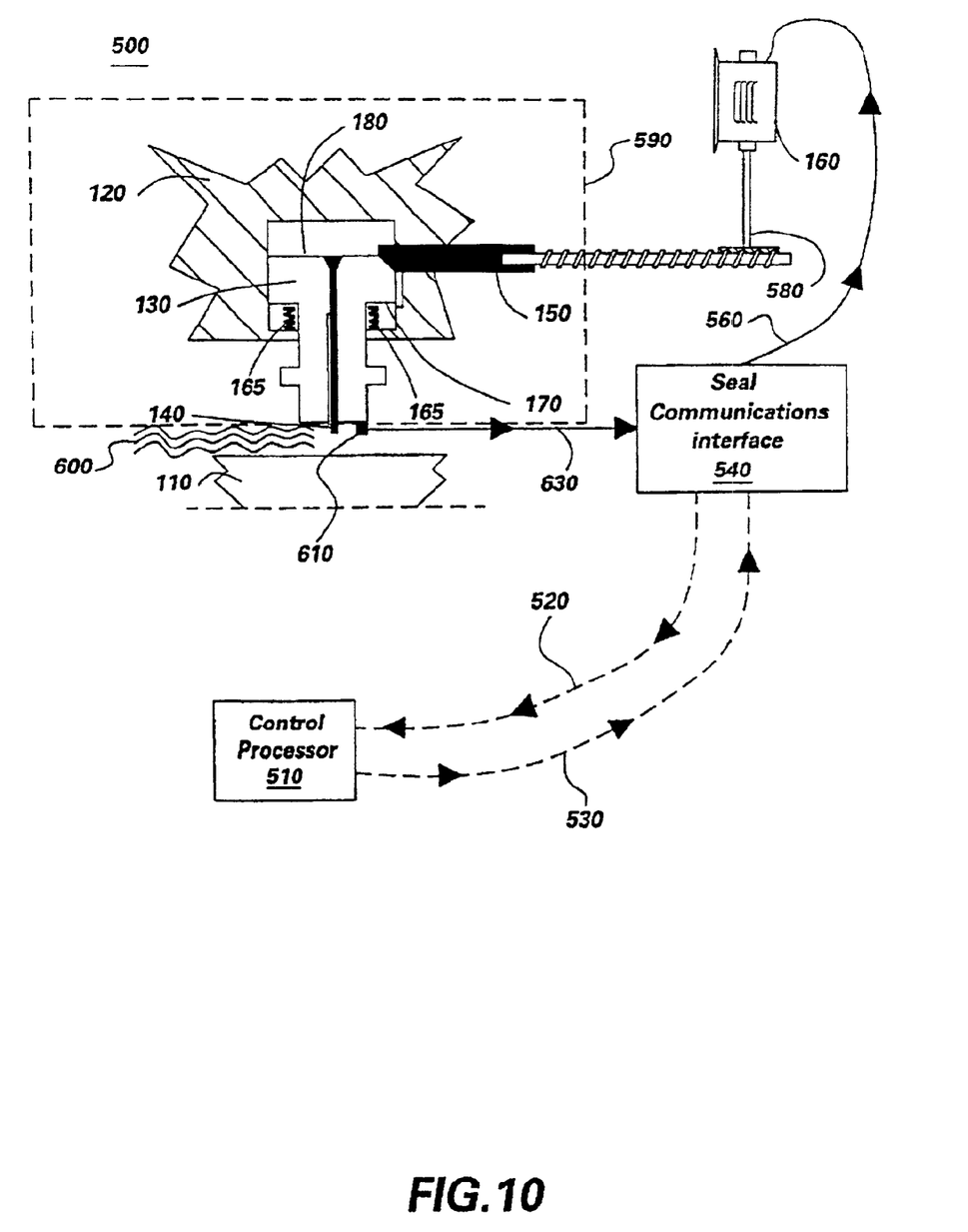
FIG. 10 is a schematic, cross-sectional exploded view of another embodiment of the instant invention.
Figure 11:
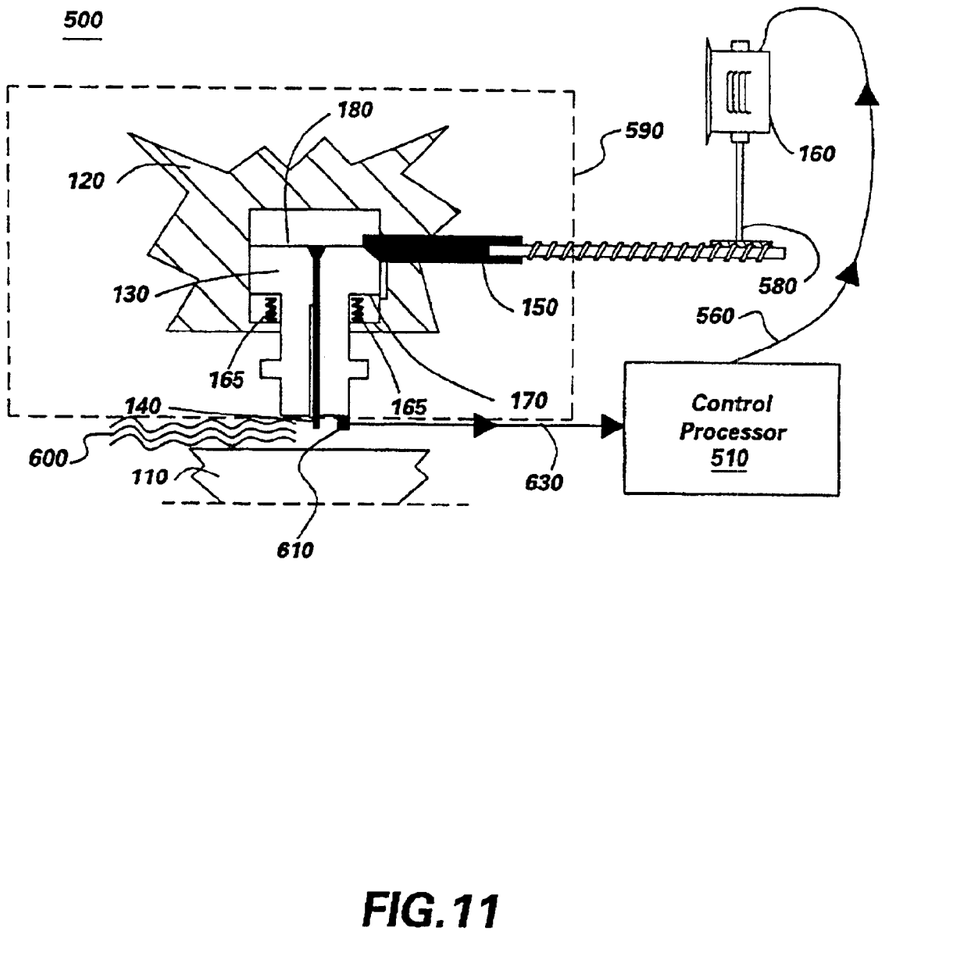
FIG. 11 is a schematic, cross-sectional exploded view of another embodiment of the instant invention.

A smart seal system 500 is shown in FIG. 9. A "smart seal system", as used herein, refers to a system in which there is some manner of automated control of the distance between seal 140 and rotating member 110. In one embodiment which represents remotely controlling the seal system 500, a control processor 510 receives a control property measurement 520 and generates a drive system command 530. At least one seal communications interface 540 receives the drive system command 530, a controllable property signal 630 and generates the control property measurement 520. Seal communications interface 540 typically comprises wireless, wired communication modalities, electrical, optical, or other means of communicating the necessary signals with the desired speed and reliability. For example, seal communications interface 540 typically comprises, but is not limited to, a communication system such as a geosynchronous L-band satellite system, a low earth orbit satellite system, a two-way paging system, a modem connection or any communication system capable of explicitly effecting communication between the control processor 510 and drive system 160 and between control processor 510 and property sensor 610. It will be appreciated that seal communications interface 540 comprises any apparatus that achieves translation between the signal formats compatible with the drive system 160, property sensor 610 and that of the control processor 510. Examples of such signal formats include, but are not limited to, parallel binary, serial binary and radio frequency communication. In an alternative embodiment which represents on-site control of the seal system 500, the control processor 510 receives controllable property signal 630. In addition, drive system 160 receives drive system signal 560 from the control processor 510 (see FIG. 11). Referring now to FIG. 10, the seal communications interface 540 transmits the control property measurement 520 and a drive system signal 560 in correspondance to the controllable property signal 630 and the drive system command 530, respectively. For example, if the seal communications interface 540 is a radio transceiver, and the controllable property signal 520 comprises an analog voltage signal encoding, for example, the temperature of the fluid path 600, then control property measurement 520 typically comprises an electromagnetic wave modulated to carry the same information as the controllable property signal 520. It will be appreciated that controllable property 620 typically includes, but is not limited to, temperature, pressure, relative position between seal 140 and rotating member 110 and the rotational speed of rotating member 110 (see FIG. 1). A drive system 170 receives the drive system signal 560 and generates motive effort 580 (see FIG. 10). "Motive effort," as used herein, typically means the generation of a force, a torque, a pressure, a heat, an electric charge or anything that causes a seal assembly 590 to move. As a result, seal assembly 590 responds to motive effort 580 so as to regulate flow in a fluid path 600. In addition, a property sensor 610 senses the controllable property 620 of the flow in the fluid path 600 and generates the controllable property signal 630 which is subsequently received by the seal communications interface 540.

In operation (see FIG. 10), for example, property sensor 610 is disposed on seal carrier 130. It will be appreciated that the at least one property sensor 610 is typically used and the location of property sensor 610 is not limited to seal carrier 130. In addition, it will be appreciated that the embodiment used in this example is meant to be used only for illustrative purposes and not meant to be a limitation to the present invention. Here, property sensor 610 detects at least one controllable property 620 of the flow in a fluid path 600, for example, the temperature of the flow in the fluid path 600 in the turbine, and generates a controllable property signal 630. The controllable property signal 630 is received by the seal communications interface 540 and is transformed to a control property measurement 520 which is subsequently received by the control processor 510, for example, from a voltage to a radio frequency (RF) signal. Here, control processor 510 sends a drive system command 530 signal, where such command signal is translated by the seal communications interface 540, and is subsequently translated to a drive system signal 560. Drive system signal 560 typically comprises command information so as to allow the drive system 160 to control the gap of the fluid path 600 defined between seal 140 and rotating member 110, for example. It will be appreciated that the drive system 160, singly or in combination with a displacement apparatus 150, generates motive effort to adjust seal assembly 590 according to the drive system signal 560. For example, the control processor 510 is typically informed that the flow in the fluid path 600 is at a certain temperature and hence send a command, via a drive system signal 560, to the drive system 160 indicating an outwardly or inwardly radial adjustment of seal assembly 590 so as to control such temperature.

Figure 12:
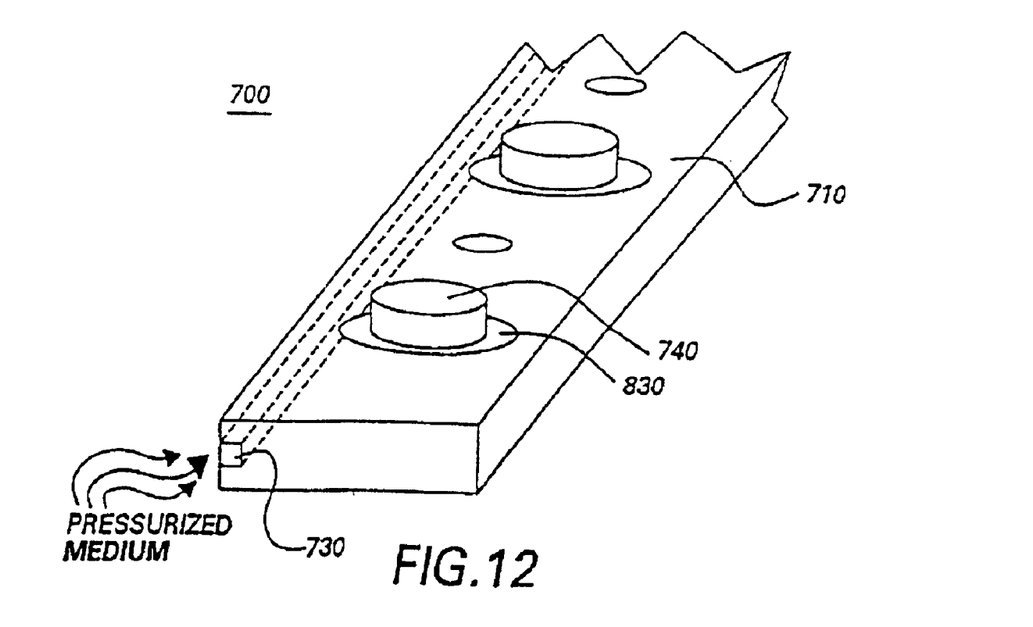
FIG. 12 is a schematic view of an actuating mechanism comprising lifting buttons disposed in respective cavities in accordance with the present invention.
Figure 13:
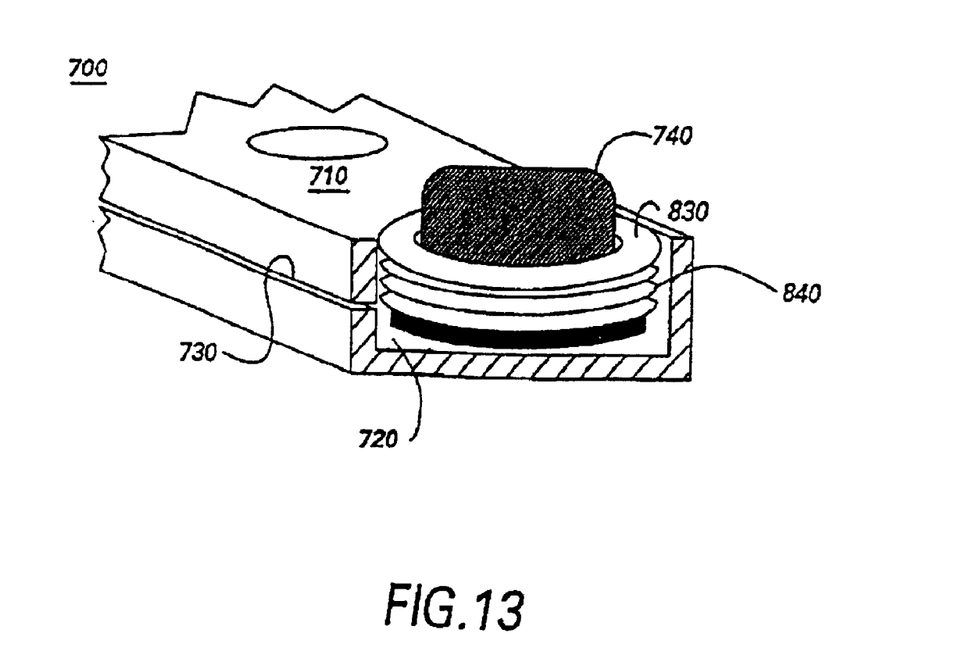
FIG. 13 is a schematic, cross-sectional exploded view of an actuating mechanism comprising a lifting button disposed in a cavity.

In another embodiment, an actuating mechanism, generally designated 700, typically comprises a housing 710 having at least one lifting button 740 disposed therein (see FIG. 12). A channel 730 is disposed in fluid communication with at least one cavity 720 and the lifting button 740 is disposed within the cavity 720 so that the button 740 is movable between a retracted position and a extended position upon introduction of a pressurized medium, for example a gas source or steam source located internally or externally to a turbine. (see FIG. 13). In an alternative embodiment, the pressurized medium is a liquid. In another embodiment, actuating mechanism 700 comprises at least one washer 830 concentrically disposed about the cavity 720 so as to restrict particulates from entering areas between lifting button 740 and housing 710. "Concentrically," as used herein, means that that washer 830 and cavity 720 are disposed in relation to each other so as to have a common axis. In addition, a compliant mechanism 840, for example a bellows, is secured to the washer 830 and lifting button 740 so as to allow compliant mechanism 840 to be radially displaced upon introduction of the pressurized medium and subsequently move seal carrier 770 radially. "Compliant," as used herein, means that the structure of the compliant mechanism 840 yields under a force or pressure, for example. In another embodiment, actuating mechanism 700 is disposed in a turbine where actuating mechanism 700 is placed between a rotating member 750, for example a rotor, and a stationary housing, for example a turbine housing 760 (see FIG. 14). Turbine housing 760 typically comprises an arcuate seal carrier 770 disposed adjacent to the rotating member 750 so as to separate pressure regions on axially opposite sides of seal carrier 770. In another embodiment, seal carrier 770 is disposed in a labyrinth seal (not shown). Seal carrier 770 typically comprises, but is not limited to, at least one seal 780, for example, at least one brush seal bristle, disposed in seal carrier 730. In addition, actuating mechanism 700 is coupled to a seal carrier top portion 790, coupled to the seal carrier bottom portion 800 and alternatively, a respective actuating mechanism 700 is disposed on seal carrier top portion 790 and seal carrier bottom portion 800 as discussed hereinafter.

Figure 14:
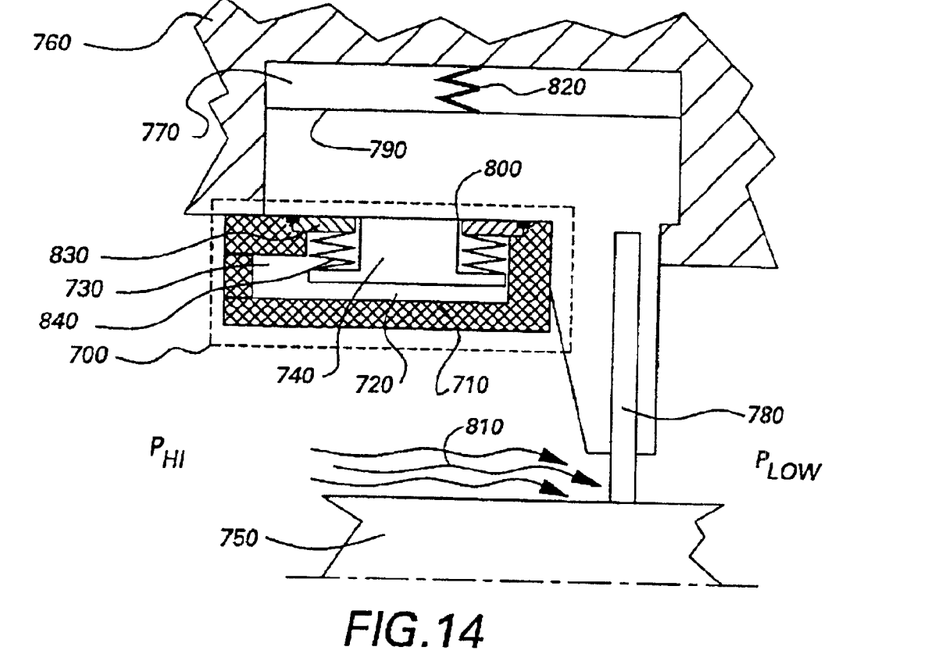
FIG. 14 is a schematic, cross-sectional exploded view of another embodiment of the instant invention.
Figure 15:
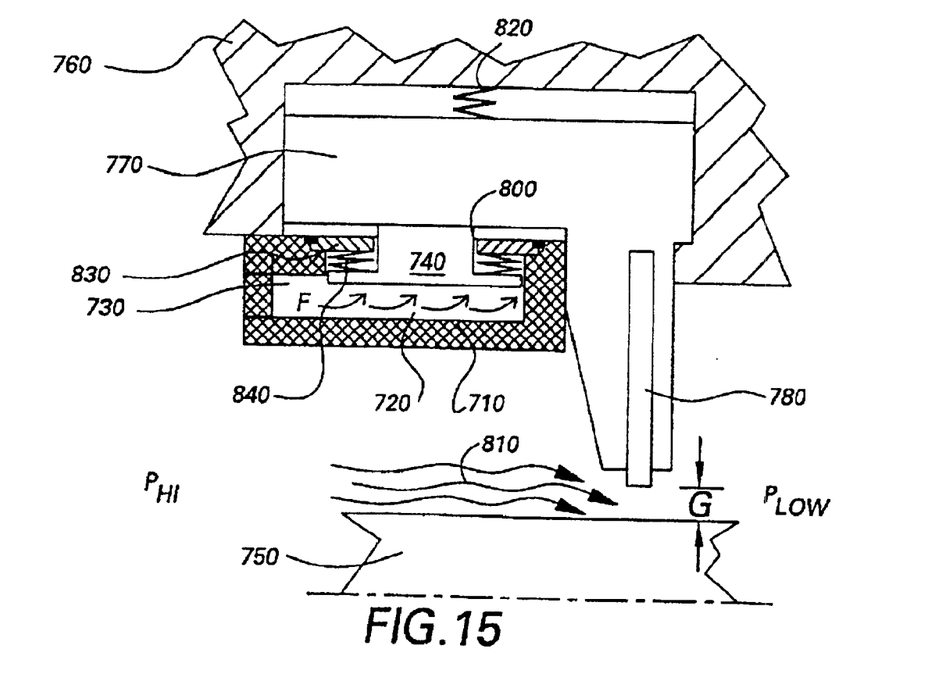
FIG. 15 is a schematic, cross-sectional exploded view of another embodiment of the instant invention.

In another embodiment, these components form part of a turbine in which a flowing fluid medium in a fluid path 810, for example, gas or steam, is passed between the rotating member 750 and turbine housing 760. For example, fluid path 810 flows from the high pressure side, designated "Phi", towards the low pressure side, designated "Plow", i.e., from the left to right of drawing FIG. 14. For illustrative purposes, FIG. 14 shows seal carrier 770 and accompanying seal 780 in a fully closed position and FIG. 15 shows seal carrier 770 and accompanying seal 780 in a fully open position. It will be appreciated that seal carrier and accompanying seal 780 are movable between the fully closed (see FIG. 14) and the fully open position (see FIG. 15). As seal carrier 770 and accompanying seal 780 are moved from the fully open position to the fully closed position (see FIG. 14), the flow in a fluid path 810 is restricted between seal 780 and rotating member 750. It will be appreciated that a throttling function occurs as seal carrier 770 moves towards the closed position due to the reduction of the cross-sectional area of the gap defined between seal 780 and rotating member 750 thereby causing reduced fluid flow therebetween. In addition, seal carrier 770 typically includes, but is not limited to, at least one gasket (not shown) consisting essentially of an o-ring, c-seal and w-seal so as to provide a seal between seal carrier 770 and labyrinth seal (not shown) or alternatively, seal carrier 770 and turbine housing 760.

In operation, actuating mechanism 700 actuates seal carrier 770, or alternatively labyrinth seal (not shown), to lift, lower or adjust seal carrier 770 position during operation or during transient events, for example, during startup and shutdown. In one embodiment, when the pressurized medium is introduced into channel 730, a pressure load, designated "F", forces seal carrier 770 radially upward resulting in lifting seal 780 away from rotating member 750 (see FIG. 15). As a result, actuating mechanism 700 acts to open a fluid path gap, designated "G", between the high and low pressure areas on axially opposite sides of the seal 780 and control the flow in the fluid path 810 between rotating member 750 and turbine housing 760. Alternatively, pressurized load "F" forces seal carrier 770 radially downward and keeps seal 780 disposed against rotating member 750.

In a further embodiment, actuating mechanism 700 is coupled to the seal carrier top portion 790, coupled to the seal carrier bottom portion 800 and alternatively, a respective actuating mechanism 700 is disposed on seal carrier top portion 790 and seal carrier bottom portion 800. In operation, actuating mechanism 700 acts to raise, lower or adjust seal carrier 770 and respective seal 780 with respect to rotating member 750. In another embodiment, actuating mechanism works in conjunction with at least one spring 820 to return seal carrier 770 to its initial position. For example, the spring 820 is located between seal carrier bottom portion 800 and turbine housing 760 so as to provide a constant outward radial force on seal carrier 770 and keep seal 780 from touching rotating member 750. In a further embodiment, it will be appreciated that spring 820 is located between seal carrier top portion 790 and turbine housing 760 (see FIG. 15).

In operation, a method of retrofitting actuating mechanism 700 in a turbine wherein actuating mechanism 700 comprises a seal carrier 770 disposed therein, comprises placing actuating mechanism 700 adjacent to seal carrier 770 such that seal carrier 770 is moved radially in correspondance with the position of lifting button 740 assembly on said actuating mechanism 700. In addition, actuating mechanism 700 comprises a housing 710 having at least one cavity 720 and a channel 730 disposed within the housing 710 in flow communication with cavity 720. The lifting button 740 assembly is disposed within the cavity 720 and is movable between a retracted position and an extended position in correspondence with the pressure in the cavity 720. One advantage to such method of retrofitting is that the actuating mechanism 700 in turbine may simply be removed and replaced with another actuating mechanism 700 thereby reducing down time of the turbine. In some operations, such method of retrofitting allows a technician to replace actuating mechanism without having to disassemble any major parts in the turbine thereby reducing repair costs.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. An actuated seal assembly for controlling flow in a fluid path in turbomachinery comprising:
   a seal;
   a seal carrier coupled to said seal, said seal carrier disposed in said turbomachinery;
   a displacement apparatus coupled to said seal carrier for positioning said seal to control said flow in said fluid path, wherein said displacement apparatus is selected from the group consisting of an actuator, a return device, and combinations thereof, and wherein said displacement apparatus selected from the group consisting of an actuator, a return device and combinations thereof is further selected from the group consisting of bellows, spring loaded rods, cams, hydraulic cylinders, pneumatic devices, piezoelectric devices, solenoids and combinations thereof; and a drive system for powering said displacement apparatus.

2. The actuated seal of claim 1, wherein said displacement apparatus comprises said actuator and said return device for moving said seal radially with respect to a rotating member.

3. The actuated seal of claim 1, wherein said seal is selected from the group consisting of brush seals, labyrinth seals, abradable seals, honeycomb seals, leaf seals, finger seals, ceramic seals, aramid seals, aspirating seals and combinations thereof.

4. The actuated seal of claim 1, wherein said seal carrier comprises a plurality of seal carriers and wherein said displacement apparatus is disposed to control each of said seal carriers in said seal assembly.

5. The actuated seal of claim 1, wherein said displacement apparatus is disposed to control a plurality of said seal carriers in said seal assembly.

6. The actuated seal of claim 1, wherein said seal carrier comprises a plurality of seal carriers and wherein said displacement apparatus is disposed to control a respective seal carrier in said seal assembly.

7. The actuated seal of claim 1, wherein said drive system is bi-directional.

8. An actuated seal assembly for controlling flow in a fluid path in turbomachinery comprising:

a seal;

a seal carrier coupled to said seal, said seal carrier disposed in said turbomachinery;

a displacement apparatus coupled to said seal carrier for positioning said seal to control said flow in said fluid path, wherein said displacement apparatus is selected from the group consisting of an actuator, a return device, and combinations thereof, and wherein said displacement apparatus selected from the group consisting of an actuator, a return device, and combinations thereof further comprises an inflatable tube; and a drive system for powering said displacement apparatus.

9. An actual seal assembly for controlling flow in a fluid path in turbomachinery comprising:

a seal;

a seal carrier coupled to said seal, said seal carrier disposed in said turbomachinery;

a displacement apparatus coupled to said seal carrier for positioning said seal to control said flow in said fluid path, wherein said displacement apparatus is selected from the group consisting of an actuator, a return device, and combination thereof; and a drive system for powering said displacement apparatus, wherein said drive system comprises a motor.

10. The actuated seal of claim 9, wherein said motor is selected from the group consisting of a linear motor and rotary motor.

11. The actuated seal of claim 9, wherein said motor further comprises a coupling.

12. The actuated seal of claim 11, wherein said coupling is selected from the group consisting of a gear, cable and pulley.

13. The actuated seal of claim 9, wherein said seal carrier is disposed in a turbine housing of the said turbomachinery.

14. The actuated seal of claim 9, wherein said seal carrier is disposed in a labyrinth seal.

* * * * *